April 5, 1966   P. C. TABBERT   3,243,825
HOSPITAL STRETCHERS AND THE LIKE
Filed Aug. 26, 1963   2 Sheets-Sheet 1
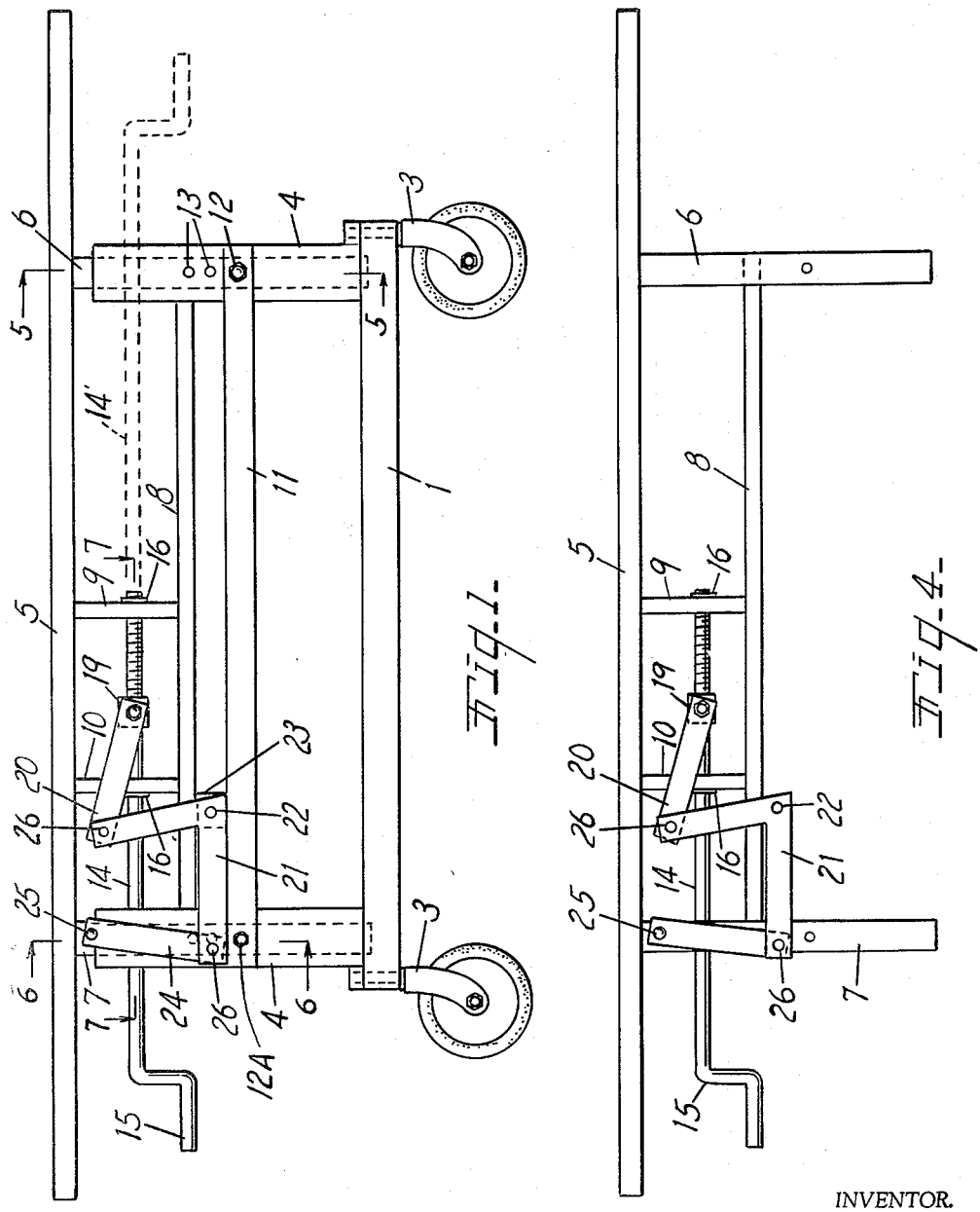
INVENTOR.
Paul C. Tabbert
BY
ATTORNEY.

April 5, 1966 P. C. TABBERT 3,243,825
HOSPITAL STRETCHERS AND THE LIKE
Filed Aug. 26, 1963 2 Sheets-Sheet 2
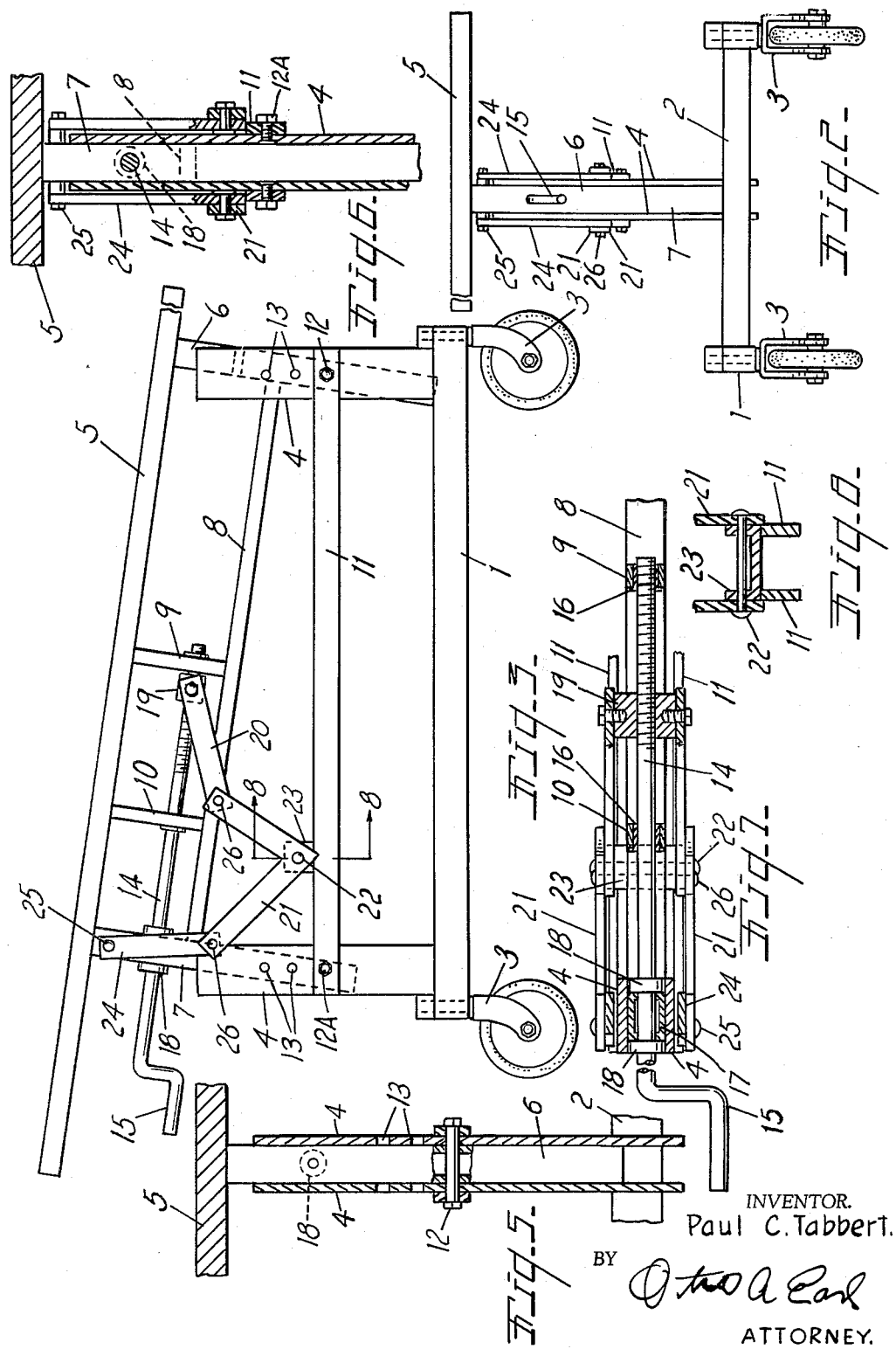
INVENTOR.
Paul C. Tabbert.
BY
ATTORNEY.

United States Patent Office

3,243,825
Patented Apr. 5, 1966

3,243,825
HOSPITAL STRETCHERS AND THE LIKE
Paul C. Tabbert, P.O. Box 126, Bridgman, Mich.
Filed Aug. 26, 1963, Ser. No. 304,498
7 Claims. (Cl. 5—62)

This invention relates to hospital stretchers and the like. The main objects of this invention are:

First, to provide a wheeled hospital stretcher which has a wide range of vertical and tilting adjustment of the platform.

Second, to provide a stretcher having these advantages which may be very quickly and easily manipulated for tilting adjustment even when occupied.

Third, to provide a hospital stretcher having these advantages in which the platform as a unit may be vertically adjusted as a unit and tiltingly adjusted by the same means in any of its vertically adjusted positions.

Fourth, to provide a hospital stretcher having these advantages which may be economically produced.

Objects relating to details and economies of the invention will appear from the description to follow. The invention is defined and pointed out in the claims. A preferred embodiment of the invention is illustrated in the accompanying drawing, in which:

FIG. 1 is a side elevational view of a structure embodying my invention, a modified form of adjusting screw being indicated by dotted lines, the connections for the several parts of the structure not being illustrated.

FIG. 2 is a fragmentary end elevational view, the parts again being shown somewhat conventionally.

FIG. 3 is a fragmentary side elevational view corresponding to that of FIG. 1 with the platform adjusted to tilted position.

FIG. 4 is a side elevational view of the platform and parts connected thereto removed from the carriage.

FIG. 5 is an enlarged fragmentary view on a line corresponding to line 5—5 of FIG. 1.

FIG. 6 is an enlarged fragmentary view partially in section on a line corresponding to line 6—6 of FIG. 1.

FIG. 7 is an enlarged fragmentary view on a line corresponding to line 7—7 of FIG. 1.

FIG. 8 is a fragmentary view in section on a line corresponding to line 8—8 of FIG. 3.

The embodiment of my invention illustrated comprises a carriage frame including the longitudinal frame member 1 with cross frame members 2 at the ends thereof. The wheel units 3 mounted on the outer ends of the end members 2 are desirably of the caster type, as is conventionally illustrated. Uprights comprising a pair of laterally spaced members 4 are fixedly mounted on the frame to project upwardly and centrally relative to the wheels.

The platform 5, which is conventionally illustrated is provided with downwardly projecting posts 6 and 7 fixedly secured to the underside thereof, these being spaced to correspond to the uprights and disposed between the upright members in laterally supported tilting engagement therewith, as is illustrated in FIGS. 1 and 2. These posts are connected by a strut member 8 which extends between the posts and is fixedly secured thereto. Laterally spaced coupling members 9 and 10 extend between the strut 8 and the platform 5 and are fixedly secured threto. This provides a unitary platform member.

The post 6 is disposed between the pair of spaced members of the right upright FIGS. 1 and 3 in laterally supported engagement therewith but is tiltingly mounted on the uprights to permit tilting adjustment, as illustrated in FIG. 3, and also to provide for vertical adjustment of the platform while permitting the same tilting adjustment in any of its vertially adjusted positions, three being illustrated.

In the embodiment of my invention illustrated the platform supported and adjusting means comprises a pair of parallel bars 11 which are mounted upon the spaced members 4 of the uprights by means of bolts 12 and 12A which may be engaged in any of the vertical sets of holes 13 provided therefor in the uprights, see FIG. 5.

In the acompanying drawing the bars 11 are shown in their lowermost position. I have not illustrated them in other adjusted positions but it will be understood that the bolt receiving holes 13 for the supporting bolts 12 and 12A which are uniformly spaced in the uprights. One of the platform posts is pivotally mounted on one upright unit by through bolt 12 while the other is laterally supported between the spaced members 4 of the other upright unit. The parallel bars 11 are secured to this upright unit by screw bolts 12A that pass through the bars 11 and into the upright members 4 but not the other post 7 (see FIG. 6).

The platform comprises the adjusting screw 14 provided with a portion terminating at its outer end in the crank like handle 15. The members 9 and 10 are provided with bearings 16 for the adjusting screw while the post 7 is provided with a bearing 17, the screw being provided with collars 18 disposed on opposite sides of the bearings so that the screw is supported against axial movement. The operating connections for the screw to the bed member in this embodiment illustrated comprises the nut 19 disposed on the threaded portion of the screw between the support members 9 and 10, the nut being connected by the link 20 to one of the upwardly diverging arms of the coupling member 21 which is pivoted at 22 on the upwardly projecting bracket 23 pivotally mounted on the bar 11. The other arm of this member 21 is connected by the link 24 to the post 7 by means of the pivot 25. The links 20 and 24 are connected to the arms of the member 21 by the pivots 26. With the parts thus arranged the platform can be easily adjusted even when occupied to and from horizontal position and it will be noted that it has a considerable range of tilting adjustment.

I have only illustrated the members 11 in one of its vertically adjusted positions, however the degree of tilting adjustment is the same with this member 11 adjusted in any one of its three positions. With this arrangement of adjusting means the strain on the parts during the adjustment is relatively slight and very little manual adjustment is required for tilting the platform even when occupied and it is securely retained in its adjusted position without the necessity of any locking or anchoring means.

I have illustrated and described my invention in a highly practical embodiment thereof. Details of connecting unitary parts are not illustrated as they form no part of my present invention and may be varied according to the materials used. While the platform may be tiltably adjusted it is effetively supported against lateral movement. Another advantage is that the parts are relatively simple and economical to produce.

In FIG. 1 the adjusting member 14 is shown as having an extension 14', indicated by dotted lines, so that the platform may be adjusted from either end. However, the operator usually stands at the head end of the platform, the platform 5 is shown conventionally and it will be understood that it is sometimes structurally varied and may include sections tiltably or pivotally associated with each other. However, such a platform is not illustrated as it forms no part of my present invention.

I have illustrated and described my invention in a highly practical embodiment thereof, both from the production and use standpoint. I have not attempted to illustrate other embodiments or adaptations as it is believed that this embodiment will enable those skilled in the art to embody or adapt the invention as may be desired.

Having thus described the invention, what is claimed as new and desired to secure by Letters Patent is:

1. A structure of the class described comprising a carriage frame including a longitudinal frame member and cross members at the ends thereof and wheels mounted on said cross members in laterally spaced relation to said longitudinal member, uprights comprising pairs of laterally spaced members fixedly mounted on said carriage to project upwardly therefrom and having vertically spaced coupling member holes therein, a platform having downwardly projecting posts fixedly connected thereto and spaced to correspond to said uprights and disposed between said upright members in laterally supported tiltable engagement therewith, a strut member disposed in downwardly spaced relation to said platform and fixedly secured to said posts, platform supporting and adjusting means comprising a pair of parallel bars extending between and supportedly secured to said upright members for vertical supported adjustment thereon by coupling members selectively disposed through said holes in said uprights, one of said platform posts being pivotally mounted on one of said uprights, an adjusting screw provided with a crank rotatably mounted on the other post, laterally spaced screw support members provided with bearings therefor disposed between and fixedly connected to said platform and said platform strut member, a nut on said screw disposed between said screw support members, and operating connections for said nut to said platform comprising a coupling member pivotally mounted on said platform supporting bars with arms projecting upwardly from its pivot and with one arm connected by a link to said nut and the other arm connected by a link to said second post.

2. A hospital stretcher comprising a carriage, uprights comprising laterally spaced members fixedly mounted on said carriage to project upwardly therefrom and having vertically spaced coupling member holes therein, a platform having downwardly projecting posts fixedly connected thereto and spaced longitudinally of said platform to project downwardly therefrom in laterally supporting engagement with said uprights, a platform supporting and adjusting member extending between and supportedly secured to said upright members for vertical supported adjustment thereon, one of said platform posts being pivotally mounted on one of said uprights, an adjusting screw provided with a crank at its outer end disposed at the outer side of one of said posts and rotatably mounted thereon, a support member for the inner end of said screw provided with a bearing therefor, a nut on said screw disposed at the inner side of said post on which said adjusted screw is rotatably mounted, and operating connections for said nut to said platform comprising a lever pivotally mounted on said platform supporting and adjusting member and having angularly disposed arms, a link connecting one arm to said nut, and a second link connecting the other arm to said second post.

3. A hospital stretcher comprising a carriage, uprights comprising laterally spaced members fixedly mounted on said carriage to project upwardly therefrom, a platform having downwardly projecting posts fixedly connected thereto and spaced longitudinally of said platform to project downwardly therefrom in laterally supported engagement with said uprights, a platform supporting and adjusting member extending between and supportedly secured to said upright members, one of said platform posts being pivotally mounted on one of said uprights, an adjusting screw rotatably mounted on one of said posts, a support member for the inner end of said screw provided with a bearing therefor, a nut on said screw disposed at the inner side of said post on which said adjusted screw is rotatably mounted, and operating connections for said nut to said platform comprising a lever pivotally mounted on said platform supporting and adjusting member and having angularly disposed arms, a link connecting one arm to said nut, and a second link connecting the other arm to said second post.

4. A structure of the class described comprising a carriage, upright comprising pairs of laterally spaced members fixedly mounted on said carriage to project upwardly therefrom, a platform having downwardly projecting posts fixedly connected thereto and spaced to correspond to said uprights and disposed between said upright members in laterally supported swingable engagement therewith, a strut disposed in downwardly spaced relation to said platform and fixedly secured to said posts, platform supporting and adjusting means comprising a supporting bar extending between and supportedly secured to said upright members, one of said posts being pivotally mounted on one of said uprights, a manually adjustable screw disposed longitudinally of and rotatably and supportedly mounted on the underside of said platform, a nut on said screw, and operating connections for said nut to said platform comprising a lever pivotally mounted on said platform supporting bar and having arms projecting in laterally diverging relation to each other, one arm being connected by a link to said nut and the other by a link to said platform.

5. A hospital stretcher of the class described comprising a carriage, uprights on said carriage, a platform having downwardly projecting posts fixedly connected thereto and spaced to correspond to said uprights and disposed in swingable laterally supported engagement therewith, one of said posts on said platform being pivotally mounted on one of said uprights and the other being slidably engaged with the other upright, platform supporting and adjusting means comprising a supporting bar extending between and supportedly connected to said uprights, an adjusting screw disposed longitudinally of and rotatably and supportedly mounted on the underside of said platform, a nut on said screw, and operating connections for said nut to said platform including a lever member pivotally mounted on said supporting bar and having laterally diverging arms, one of which is operatingly connected to said nut and the other to said platform.

6. A hospital stretcher of the class described comprising a carriage provided with uprights, a platform having downwardly projecting posts fixedly connected thereto and spaced to correspond to said uprights and disposed in swingable laterally supported engagement therewith, one of said posts on said platform being pivotally mounted on one of said uprights and the other being slidably engaged with the other upright, platform supporting and adjusting means comprising an adjusting screw disposed longitudinally of and rotatably and supportedly mounted on the underside of said platform, a nut on said screw, a coupling member pivotally and supportedly mounted on said carriage for vertical adjustment and having diverging arms, one of which is operatively connected to said nut to be actuated thereby and the other to said platform.

7. A hospital stretcher of the class described comprising a carriage provided with uprights, a platform having downwardly projecting posts fixedly connected thereto and spaced to correspond to said uprights and disposed in swingable laterally supported engagement therewith, one of said posts on said platform being pivotally mounted on one of said uprights and the other being slidably engaged with the other upright, platform supporting and adjusting means comprising a rotatably supporting adjusting screw supportedly mounted below said platform, a nut on said screw, and coupling means for said nut to said platform including a member pivotally mounted on said carriage and connected by a first link to said nut and by a second link to said platform, whereby said platform is adjusted on its pivot by the manual manipulation of said screw.

References Cited by the Examiner
UNITED STATES PATENTS

| | | | |
|---|---|---|---|
| 2,261,297 | 11/1941 | Seib | 5—86 |
| 2,445,258 | 7/1948 | Beem | 5—67 |
| 2,877,074 | 3/1959 | Oberraugh | 108—10 |
| 3,050,745 | 8/1962 | Tabbert | 5—62 |

FRANK B. SHERRY, *Primary Examiner.*